United States Patent
El Hattami et al.

(10) Patent No.: US 12,373,171 B2
(45) Date of Patent: Jul. 29, 2025

(54) AUTOMATIC FLOW IMPLEMENTATION FROM TEXT INPUT

(71) Applicant: ServiceNow, Inc., Santa Clara, CA (US)

(72) Inventors: Amine El Hattami, Montreal (CA); Christopher Joseph Pal, Montreal (CA)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 17/752,564

(22) Filed: May 24, 2022

(65) Prior Publication Data

US 2023/0385026 A1    Nov. 30, 2023

(51) Int. Cl.
G06F 8/10 (2018.01)
G06F 8/30 (2018.01)
G06F 40/45 (2020.01)

(52) U.S. Cl.
CPC ............ G06F 8/10 (2013.01); G06F 8/31 (2013.01); G06F 40/45 (2020.01)

(58) Field of Classification Search
None
See application file for complete search history.

(56) References Cited

U.S. PATENT DOCUMENTS

| | | | | |
|---|---|---|---|---|
| 8,423,952 B2* | 4/2013 | Bogl | ............ | G06Q 10/06 717/105 |
| 8,707,249 B2* | 4/2014 | Maine | ............ | G06Q 10/06 717/109 |
| 10,554,817 B1 | 2/2020 | Sullivan | | |
| 2009/0088870 A1 | 4/2009 | Baier | | |
| 2009/0088879 A1* | 4/2009 | Okano | ............ | H04S 3/00 700/94 |
| 2019/0370615 A1 | 12/2019 | Murphy | | |
| 2020/0192975 A1 | 6/2020 | Maes | | |
| 2020/0210911 A1 | 7/2020 | Kim | | |
| 2021/0109487 A1 | 4/2021 | Kartik | | |
| 2021/0241094 A1* | 8/2021 | Cheng | ............ | G06N 3/08 |

(Continued)

FOREIGN PATENT DOCUMENTS

| | | | | |
|---|---|---|---|---|
| EP | 3454203 A1 * | 3/2019 | ............ | G06F 8/10 |
| JP | 2019159602 | 9/2019 | | |

(Continued)

OTHER PUBLICATIONS

Bolukbasi et al., "Man is to Computer Programmer as Woman is to Homemaker? Debiasing Word Embeddings," ResearchGate, 2016, 26pg. (Year: 2016).*

(Continued)

*Primary Examiner* — Ryan D. Coyer
(74) *Attorney, Agent, or Firm* — FLETCHER YODER PC

(57) ABSTRACT

A user provided text description of at least a portion of a desired workflow is received. Context information associated with the desired workflow is determined. Machine learning inputs based at least in part on the text description and the context information are provided to a machine learning model to determine an implementation prediction for the desired workflow. One or more processors are used to automatically implement the implementation prediction as a computerized workflow implementation of at least a portion of the desired workflow.

20 Claims, 9 Drawing Sheets

(56) References Cited

U.S. PATENT DOCUMENTS

| | | | |
|---|---|---|---|
| 2021/0326751 A1* | 10/2021 | Liu | G06N 3/084 |
| 2022/0004954 A1 | 1/2022 | Rafferty | |
| 2022/0130272 A1* | 4/2022 | Foroughi | G09B 7/00 |
| 2023/0315766 A1* | 10/2023 | Cho | G06F 16/3338 |
| | | | 707/722 |

FOREIGN PATENT DOCUMENTS

| | | |
|---|---|---|
| JP | 2023083598 A | 6/2023 |
| WO | 2016090010 | 6/2016 |
| WO | 20210138163 | 7/2021 |
| WO | 2022081380 | 4/2022 |

OTHER PUBLICATIONS

Mehrabi et al., "A Survey on Bias and Fairness in Machine Learning," USC-ISI, 2022, 34pg. (Year: 2022).*

Zhao at el., "Gender Bias in Contextualized Word Embeddings," cs.CL, 2019, 6pg. (Year: 2019).*

Kiela, D. et al., 'Dynamic Meta-Embeddings for Improved Sentence Representations', arXiv:1804.07983, retrieved from <https://arxiv.org/pdf/1804.07983>, Sep. 5, 2018.

Vu, X. et al., 'ETNLP: avisual-aided systematic approach to select pre-trained embeddings for a downstream task', arXiv:1903.04433, Retrieved from <https://arxiv.org/pdf/1903.04433>, Aug. 3, 2019.

Wang, X. et al., 'Automated Concatenation of Embeddings for Structured Prediction', arXiv:2010.05006, retrieved from <https://arxiv.org/pdf/2010.05006>, Jun. 1, 2021.

Zhou, Y. et al., 'Learning Sense-Specific Static Embeddings using Contextualised Word Embeddings as a Proxy', arXiv:2110.02204, retrieved from <URL: https://arxiv.org/pdf/2110.02204 >, Oct. 6, 2021.

Notice of Intent to Grant Patent for Japanese Patent Application No.

* cited by examiner

AUTOMATIC FLOW IMPLEMENTATION FROM TEXT INPUT

BACKGROUND OF THE INVENTION

Machine-assisted development of computer instructions allows for developers to create executable sequences of computer actions without requiring significant knowledge of a computer language. Computer instructions can be in the form of automated processes, computer programs, or other collections of instructions that tell a computer how to operate. To develop computer instructions, for example, developers can interact with a graphical user interface of a development tool. However, sometimes, developers may be challenged by the difficulty of learning to use the development tool. They may be overwhelmed by the many options within the development tool and may not utilize best practices. Thus, there is a need for techniques to assist developers in this regard.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Automatic flow implementation from text input is disclosed. A user provided text description of at least a portion of a desired workflow is received. Context information associated with the desired workflow is determined. Machine learning inputs based at least in part on the text description and the context information are provided to a machine learning model to determine an implementation prediction for the desired workflow. One or more processors are used to automatically implement the implementation prediction as a computerized workflow implementation of at least a portion of the desired workflow.

Figure 2:
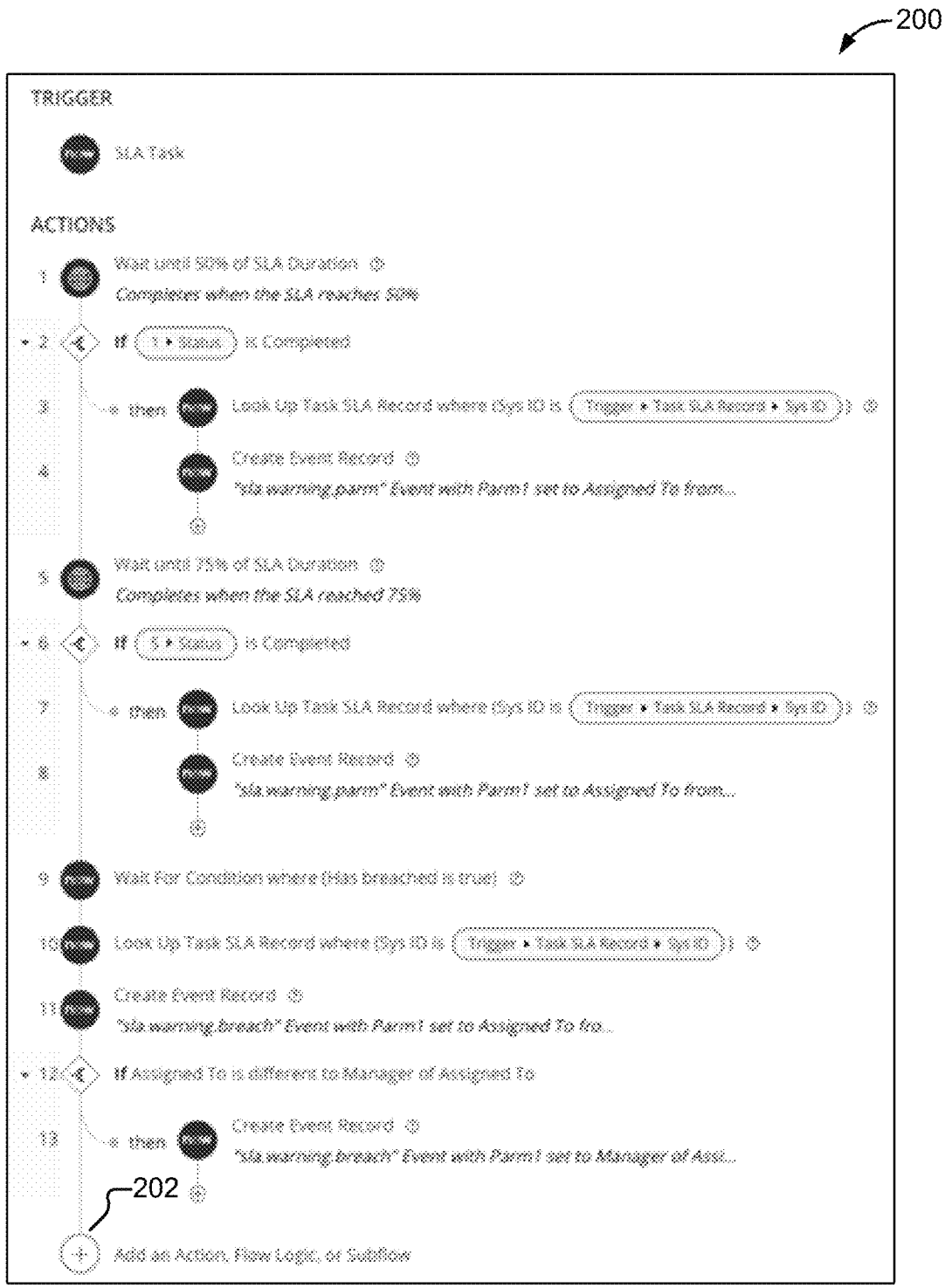
FIG. 2 is a diagram illustrating an example of a computerized flow.
Figure 3:
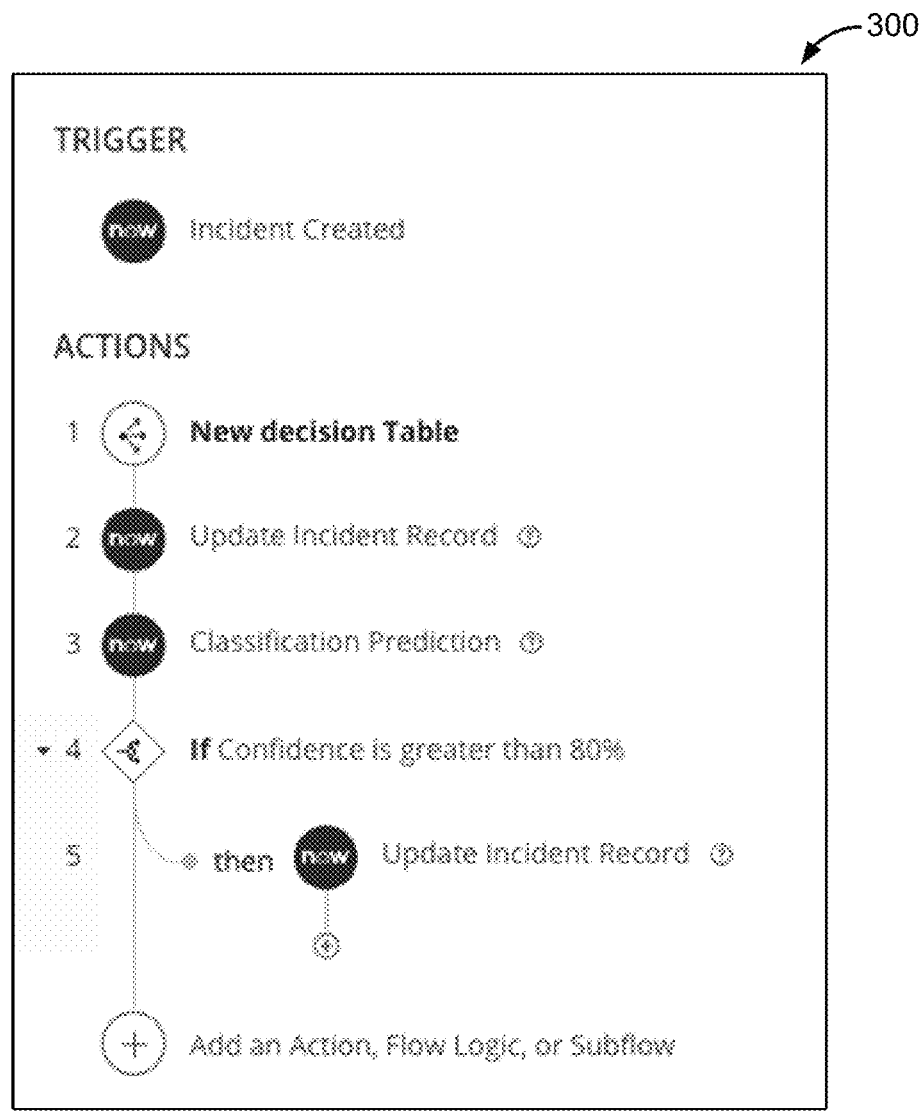
FIG. 3 is a diagram illustrating an example of an automatically implemented computerized flow that promotes best practices.

Many low-code environments rely on a graphical user interface, which hides executable code associated with workflows. As used herein, a workflow, which can also be called a "computerized workflow", "computerized flow", "automation flow", "action flow", "flow", and so forth, refers to an automatic process (e.g., performed by a programmed computer system) comprised of a sequence of actions. The sequence of actions can also be called a sequence of steps, sequence of action steps, etc. Oftentimes, a workflow also includes a trigger for the sequence of actions. Examples of flows are shown in FIGS. 2, 3, and 5C. The techniques disclosed herein solve the technological problem of allowing for efficient computerized workflow generation in scenarios in which use of a graphical user interface is difficult. The techniques disclosed herein allow users to use free-form natural language to instantiate steps of workflows, which can be displayed as visual steps in the graphical user interface. Stated alternatively, automation flows can be generated from natural language descriptions. Using a graphical user interface can be challenging for inexperienced users, especially since there may be hundreds of available steps. The techniques disclosed herein have many benefits, including reducing the user learning curve, promoting best practices for novice users, and helping experienced users discover new features.

In various embodiments, the techniques disclosed herein utilize large, pre-trained language models, leading to a highly adaptable system that requires only a few labeled samples, and as a result, is more robust to user input variation compared to rule-based techniques. The techniques disclosed herein are widely applicable to different types of automation flow builder applications. In various embodiments, as described in further detail herein, a trained machine learning model receives a natural language description of a flow and then predicts all the actions for the flow in the proper order. Manual processing and feature engineering are not required because the machine learning model has learned to perform this task from the training examples. Furthermore, pre-processing is not required because user input can be ingested as is. In various embodiments, the machine learning model's output is converted to application programming interface (API) calls to be transmitted to a flow builder application. These techniques are described in further detail below.

Figure 1:
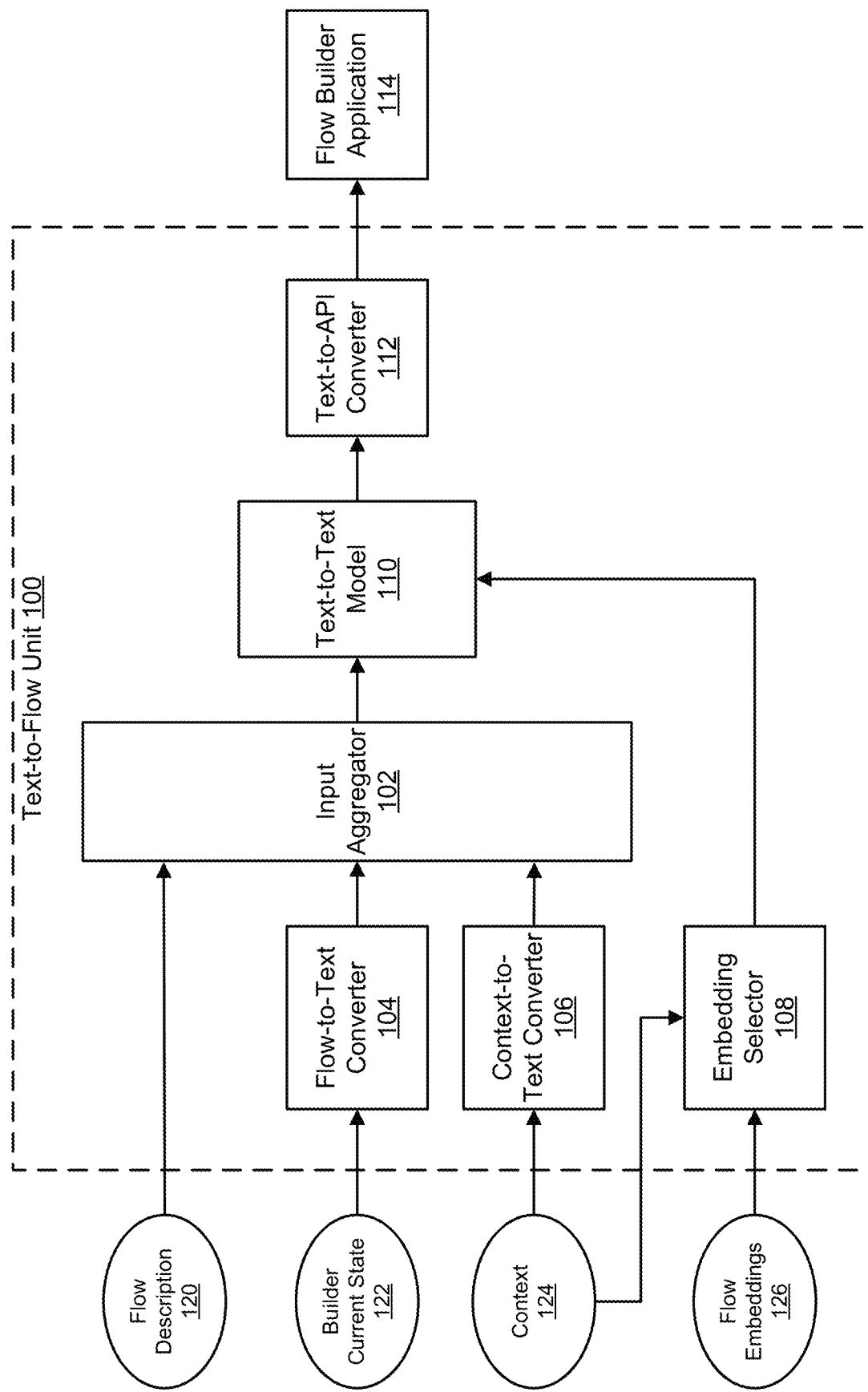
FIG. 1 is a block diagram illustrating an embodiment of a system for automatically implementing a computerized flow based on text input.
Figure 7:
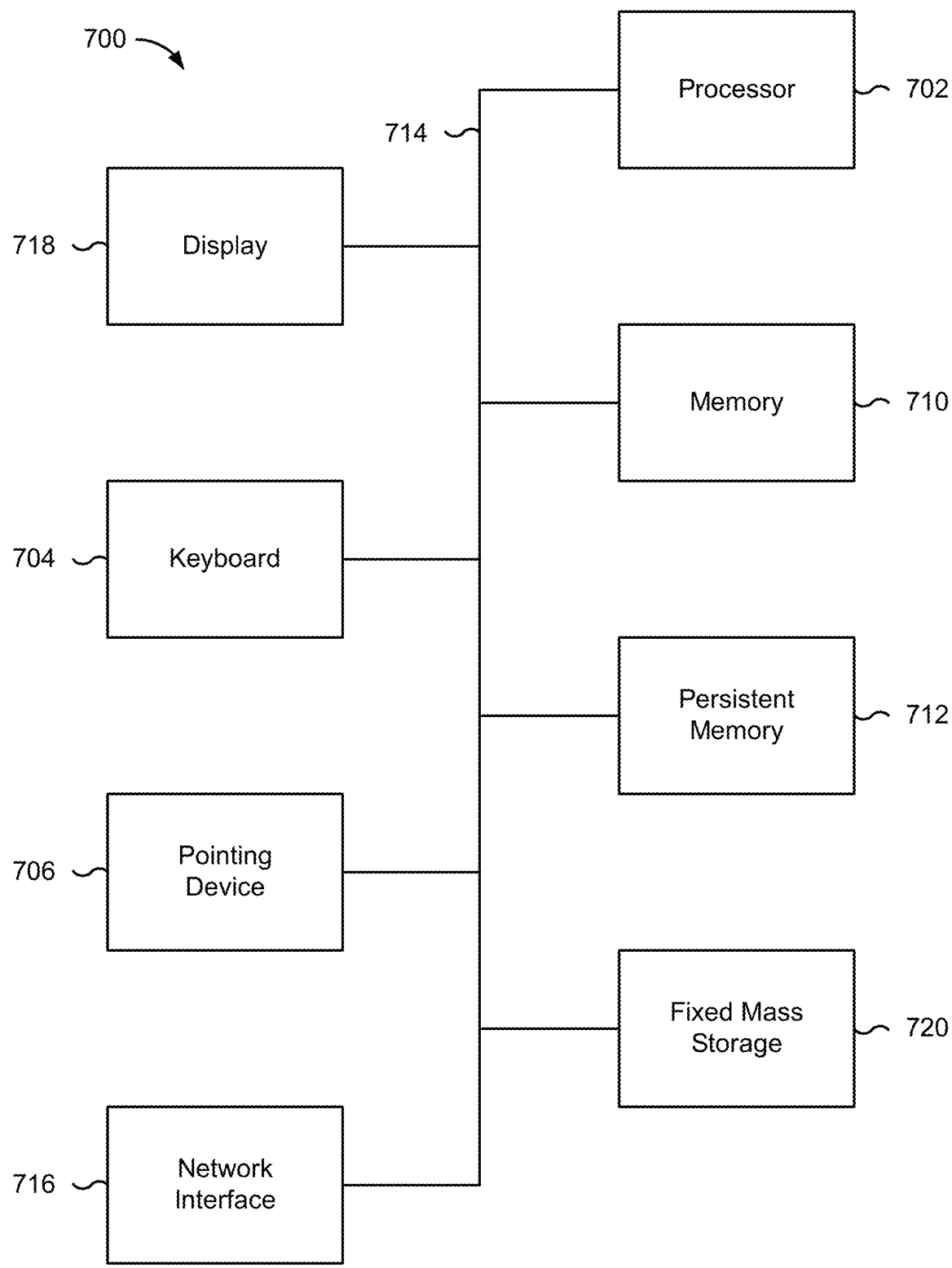
FIG. 7 is a functional diagram illustrating a programmed computer system.

FIG. 1 is a block diagram illustrating an embodiment of a system for automatically implementing a computerized flow based on text input. In the example illustrated, text-to-flow unit 100 is comprised of input aggregator 102, flow-to-text converter 104, context-to-text converter 106, embedding selector 108, text-to-text model 110, and text-to-API converter 112. In the example shown, flow builder application 114 is separate from text-to-flow unit 100, but it is also possible, in alternative embodiments, for flow builder application 114 to be incorporated as a component of text-to-flow unit 100. In some embodiments, flow-to-text unit 100 (including its components) is comprised of computer program instructions that are executed on a general-purpose processor, e.g., a central processing unit (CPU), of a programmed computer system. FIG. 7 illustrates an example of a programmed computer system. It is also possible for the logic of flow-to-text unit 100 to be executed on other hardware, e.g., executed using an application-specific integrated circuit (ASIC) or a field-programmable gate array (FPGA). In the example illustrated, text-to-flow unit 100 provides outputs to flow builder application 114. In various embodiments, flow builder application 114 includes software that can be interfaced with via an API. In the example illustrated, the input data to text-to-flow unit 100 are flow description 120, builder current state 122, context 124, and flow embeddings 126.

In various embodiments, flow description 120 is a mandatory text input that describes either an entire flow, a partial flow, or a single step (e.g., a single action in a flow). Flow description 120 comprises a step description that can be a known description or any other semantically equivalent description (e.g., "Create record" and "Add a record to a table" will both generate the same flow step). In the example shown, flow description 120 is received by input aggregator 102. In various embodiments, input aggregator 102 creates input text for text-to-text model 110. In various embodiments, input aggregator 102 does not modify flow description 120. In various embodiments, input aggregator 102 checks to ensure that flow description 120 is a non-empty string because flow description 120 is mandatory, whereas the other inputs to text-to-flow unit 100 are not. In the example illustrated, input aggregator 102 also receives text inputs from flow-to-text converter 104 and context-to-text converter 106. In various embodiments, input aggregator 102 determines a flow description based on flow description 120 and the output of flow-to-text converter 104 and combines this with context information that is a text output of context-to-text converter 106. In some embodiments, there is a specified order in which the information is combined because starting with the elements that have more influence on the output of text-to-text model 110 can lead to better results.

The techniques disclosed herein can also be applied to other information mediums, such as audio or video. Stated alternatively, a flow description may be provided in another format (e.g., as audio, video, etc.). For embodiments in which an audio or video flow description is received, text-to-flow unit 100 can include a media-to-text converter module that receives the audio and/or video and converts the audio and/or video to text. For example, to convert audio to text, any one of various speech recognition techniques known to those skilled in the art may be utilized to generate a text form (e.g., in the same format as flow description 120) of the audio input. Text-to-flow unit 100 can then utilize the text form in the same manner as that described for flow description 120. Similarly, video-to-text techniques known to those skilled in the art may be utilized to generate the text form from a video input.

In the example illustrated, builder current state 122 is an optional input used when predicting a partial flow. Predicting partial flows adds steps to an incomplete flow either by specifying a single step or multiple steps. The single-step use case can enable the techniques disclosed herein to work in a chatbot-like system where the user provides interaction to create the flow step-by-step. In various embodiments, builder current state 122 includes two items: 1) existing steps: the steps already created by the user in the builder either by using a user interface or a previous call to text-to-flow unit 100; and 2) current position: the position from which the user had requested to generate the flow (stated alternatively, the index in the existing steps list). In the example shown, builder current state 122 is received by flow-to-text converter 104. Flow-to-text converter 104 converts the existing flow and the current position to a text format. In some embodiments, the existing steps in builder current state 122 are in either an Extensible Markup Language (XML) or JavaScript Object Notation (JSON) format. Thus, in some embodiments, flow-to-text converter 104 converts XML or JSON data to text. Builder current state 122 can be in any known data format (e.g., XML, JSON, etc.). The examples of XML and JSON are merely illustrative and not restrictive.

Suppose the existing steps are "Send Email" ("Send Email" being the step name) and "Create Incident Record" ("Create a record" being the step name and "Incident" being a step parameter that represents a table name). The current position would be the third position and indicates the insertion point. In various embodiments, flow-to-text converter 104 first serializes the existing steps by converting each one from name to description using a one-to-one mapping and extracting any existing step parameter. The output that is generated may be in the format: "Existing Steps: step 1 [parameter 1], step 2, . . . , step N [parameter N] Current Position: X". In this format, "Existing Steps" and "Current Position" are prefixes that differentiate the existing steps from the current position. This is needed because the output of flow-to-text converter 104 is in a text format. In various embodiments, text-to-text model 110, uses the existing steps to modulate the output when predicting partial flows, which is helpful for steps that are affected by previously created ones. Text-to-text model 110 can verify how likely a specific step is to occur given the previous ones learned during the training phase of text-to-text model 110. In scenarios in which the user did not create any steps before making a call to text-to-flow unit 100, builder current state 122 would not have any meaningful information and the output of flow-to-text converter 104 would be an empty string.

In the example illustrated, context 124 is another optional input. Context 124 may be used to condition text-to-text model 110's output. This conditioning aims to refine text-to-text model 110's prediction based on external factors other than a flow description provided by the user. With respect to context 124, text-to-text model 110 is able to use specific available context items to modulate its output. For example, depending on the creator of the flow, or the business unit, the handling of some cases such as the error handling, logging, or managing approvals can be different. For example, a user or set of users might send an email to an administrator if the flow fails, while others will log an error message and terminate the flow. Context 124 affects text-to-text model 110 through patterns in the training data used to train text-to-text model 110. In some embodiments, context 124 includes the following items: 1) application metadata: application properties such as application name, business unit, creator, etc.; 2) flow metadata: flow properties such as title, creation date, creator, etc.; 3) preferences, e.g., enable one-to-one prediction (as described in further detail below), set the list of the steps to use (as described in further detail below with respect to out-of-domain step description), and embedding ID (as described in further detail below with respect to flow embeddings). Context 124 may be in an XML, JSON, or other known data format. The above can be considered conditioning parameters for text-to-text model 110.

In various embodiments, context-to-text converter 106 receives context 124 (e.g., in an XML or JSON format) and encodes all the elements of the context except the flow embedding ID into a text format. In various embodiments, all the elements of the context are represented as a list of key-value pairs, which means that the text output of context-to-text converter 106 can be formatted in the following manner: "Preferences: key 1[Value 1], . . . , Key n [Value n] App Metadata: key 1[Value 1], . . . , Key n [Value n] Flow Metadata: key 1[Value 1], . . . , Key n [Value n]". "Preferences", "App Metadata", and "Flow Metadata" are prefixes that differentiate each part of the serialized text. Context-to-text converter 106 does not require having all the context items available, meaning that, e.g., if the flow metadata is missing, flow-to-text converter 106 will only serialize the other available items. In scenarios in which the entire context is unavailable, context-to-text converter 106 outputs an empty string.

In the example illustrated, flow embeddings 126 is another optional input. Flow embeddings 126 includes a list of previously learned flow embeddings. In various embodiments, flow embeddings 126 comprises embeddings that have been based on existing flows and that can be used to condition text-to-text model 110. Such conditioning can tailor text-to-text model 110's output to resemble previously created flows. In some embodiments, flow embeddings 126 is a list of fixed-sized tensors that are learned individually during training of text-to-text model 110. Each flow embedding can be related to a single dataset and can be stored on a disk or in memory. The embeddings can be viewed as a way to describe the differences between training one set of data versus another and as a way to factorize model weights. For example, two different datasets may be used during a training stage to train a single machine learning model with a single set of model weights and two different embeddings for each of the datasets. Then, during deployment of the machine learning model in inference mode, the embeddings can be swapped to match each training dataset without interrupting the machine learning model. While it is possible to achieve similar results without using the embeddings by training two different models, using embeddings reduces computational and other costs because only a single model needs to be created, deployed, and maintained. Notwithstanding the above, it is also possible to train two different models and use the techniques disclosed herein since the embedding feature is optional. This may be useful in scenarios in which datasets need to be separated (e.g., for confidentiality reasons). In the example shown, embedding selector 108 selects and loads an embedding (e.g., a tensor) from flow embeddings 126. This can be accomplished by using a flow embedding ID of context 124 to indicate the selection. In scenarios in which no flow embedding ID is provided, embedding selector 108 outputs a NULL tensor. In some embodiments, a selected embedding tensor is loaded to a processor implementing text-to-text model 110, e.g., a central processing unit (CPU), graphics processing unit (GPU), etc. when the embedding is selected.

In various embodiments, text-to-text model 110 predicts an entire flow or partial flow based at least in part on flow description 120. Text-to-text model 110 may also utilize inputs other than a user-provided flow description depending on builder current state 122 and context 124. Specifically, the prediction of text-to-text model 110 may be modulated by inputs such as context parameters, existing steps, and/or flow embeddings. In some embodiments, the flow is predicted by text-to-text model 110 in a text format as follows: "Step description 1, Step description 2 [parameter 1], . . . , Step description N [parameter 1, . . . , parameter M]". Depending on the user input, the output can include a single parameter, multiple parameters, or zero parameters. The architecture of text-to-text model 110 may be based on various machine learning architectures configured to perform end-to-end learning of semantic mappings from input to output, including transformers and recurrent neural networks (RNNs) (large language models (LLMs)). Text-to-text model 110 has been trained on text examples and is configured to receive a text input and generate a text output. In various embodiments, text-to-text model 110 has been trained by utilizing transfer learning. Transfer learning refers to first pre-training a model on a data-rich task and then fine-tuning the model on a downstream task. In some embodiments, text-to-text model 110 is an LLM that has an Encoder-Decoder architecture. In various embodiments, text-to-text model 110 has been pre-trained on a multi-task mixture of unsupervised and supervised tasks for which each task is converted into a text-to-text format. An example of an LLM model with an Encoder-Decoder architecture is the T5 model.

Text-to-text model 110 can be configured to predict more than what the user requested in the flow description. For example, text-to-text model 110 may predict an "if" step after an "Ask for approval" step even if the user only requested an "Ask for approval" step because this pattern occurs frequently in training data. The purpose of this feature is to help the user follow best practices and reduce flow description length. While this feature can benefit novice users, a more experienced user may find it distracting. Therefore, in various embodiments, this feature can be disabled by enabling one-to-one prediction (text-to-text model 110 configured to predict precisely what the user describes) as a preference in context 124 (as described above).

Context 124 can also be used to control out-of-domain step descriptions by text-to-text model 110. To ensure that text-to-text model 110 does not output any out-of-domain steps, the user can provide a list of possible steps via context 124. Text-to-text model 110 will not predict a step in this mode if it is not in the provided list. For example, the model output for "send an email, buy milk, create incident record" could be "Send an email, Create table record [incident]" with the "buy milk" step excluded if the "buy milk" step is not in the list of possible steps. On the other hand, if the user does not provide a list of possible steps, the model output for this example would be "Send an email, buy milk, Create table record [incident]." Though, text-to-API converter 112 may remove and log the "buy milk" step because it might not have an API call mapping for this step. System administrators can then later use the logged information to analyze user requests to determine what text-to-flow unit 100 should be configured to handle. For example, if text-to-flow unit 100 only handles "send email" to communicate with individuals while users are trying to send information by Short Message Service (SMS), a system administrator may use this information to configure a "Send SMS" step. The user can also provide a new step (never seen in the training data) in the list of possible steps. Thus, instead of inventing a new step, text-to-text model 110 can use newly added steps that match flow descriptions. For example, assume the flow description includes "communicate via SMS." If the user adds a "Send SMS" step to the list of possible steps, text-to-text model 110 would output "Send SMS". Alternatively, if there is no user-provided step, text-to-text model 110 may predict "communicate with SMS" on its own (inventing this step). This feature avoids the need to re-train text-to-text model 110 and reduces the computational cost of training text-to-text model 110. In various embodiments, the user can also manually edit results that text-to-text model 110 outputs incorrectly from a flow builder user interface.

In some embodiments, in addition to predicting flow steps, text-to-text model 110 also extracts slot values for steps. For example, in the input "create an incident record," the slot value is "incident," which represents a table name where the record will be created. FIG. 5C illustrates another example of a slot value representing a table. Text-to-text model 110 does not require the user to provide the exact name for values with identifier names (e.g., table names, application names, etc.). For example, text-to-text model 110 can predict the same table name for "create an incident record" and "create an issue record," if there is no "issues" table (extrapolating from incident record to issues record). Thus, due to the architecture and training of text-to-text model 110, variations in how a user might describe a slot value are handled automatically. For example, from the model perspective, "create an incident record" is similar to "create a record in the incident table" because of the natural language similarity. Slot value format variations in date and time values are encountered during training and thus can be handled. For example, in various embodiments, text-to-text model 110 is trained to extract the same time value from "8 pm", "20 h," and "8 p.m." It is also possible to achieve correct results without seeing all possible combinations during training (e.g., not encounter a pattern with a typo but still be able to correct the typo because similar typos are encountered during training). By utilizing natural language pre-training, the amount of training data required to achieve reliable performance is reduced.

Due to the text-to-text architecture utilized, text-to-text model 110 can adapt to new sets of steps without any changes to the model. This reduces the required modeling and experimentation effort. In addition, this ability is crucial from a use case perspective because users will have a diverse set of enabled steps that can evolve rapidly. Thus, using the techniques disclosed herein, it is possible to avoid creating a new model for each user, which reduces costs. As mentioned above, text-to-text model 110 handles variations in how a user describes a flow, which is more powerful than existing match-based systems. For example, text-to-text model 110 can determine that "lookup records" and "search for entries in a table" can refer to the same thing depending on use case. In contrast, handling this with either a rule-based system or classical natural language processing (NLP) models can be highly challenging. Another benefit is that text-to-text model 110 can understand the positionality of steps and the composition of a flow. In the flow examples disclosed herein, a flow starts with a trigger (e.g., "when an email is received"). However, a user might not begin the flow description with the trigger description. For example, text-to-text model 110 would produce the same flow for "Create an incident record when an email is received" and "When an email is received, create an incident record." This advantage is highly significant as the number of steps increases (e.g., for a flow length of ten steps). Text-to-text model 110 does not require seeing all possible combinations or ways to describe the same thing semantically because it is pre-trained in an unsupervised fashion on a large-scale language dataset before being fine-tuned for the text-to-automation flow task, which reduces the data requirements needed to fine-tune text-to-text model 110.

From a model deployment perspective, using a text-to-text architecture reduces the effort to deploy a new model because it is not necessary to redo performance or hardware compatibility tests. In contrast, other machine learning models that perform classification using a single classification layer with a fixed number of output categories need to be modified when the number of classification classes changes, which can push the model response time above an upper bound that an application requires. Furthermore, if the number of classes grows exponentially, a traditional model might no longer fit the available hardware. In a traditional machine learning implementation, it may also be necessary to add a new classification component for each task in a multitask setup. In contrast, with the techniques disclosed herein, only a single configuration needs to be modified.

In the example illustrated, text-to-API converter 112 converts a text output of text-to-text model 110 to an API format. In some embodiments, text-to-API converter 112 uses a defined one-to-one mapping from step descriptions to API calls. In various embodiments, if the output of text-to-text model 110 includes an out-of-domain step description, text-to-API converter 112 removes the out-of-domain step and logs an event for a monitoring system. Thus, text-to-API converter 112 would only execute API calls for valid steps.

In the example illustrated, text-to-flow unit 100 does not create the final flows, but rather outputs API calls to flow builder application 114 to complete the conversion of the predicted flow in text format to actual flows. Flow builder application 114 is instructed to create a flow via API calls. An example of a flow builder application is the Service-Now® Flow Designer Platform. However, this example is merely illustrative and not restrictive. The techniques disclosed herein are not limited to this builder and can be utilized with any other automation flow builder application. Handling a new builder application includes creating the step descriptions used as the output of text-to-text model 110 and updating text-to-API converter 112 with new API calls (e.g., creating one-to-one mapping updates). Furthermore, text-to-flow unit 100 and any of one or more flow builder applications may be integrated into a single, cohesive unit without changing the techniques disclosed herein.

In the example shown, portions of the communication path between the components are shown. Other communication paths may exist, and the example of FIG. 1 has been simplified to illustrate the example clearly. Although single instances of components have been shown to simplify the diagram, additional instances of any of the components shown in FIG. 1 may exist. The number of components and the connections shown in FIG. 1 are merely illustrative. Components not shown in FIG. 1 may also exist.

FIG. 2 is a diagram illustrating an example of a computerized flow. In the example shown, flow 200 is used to automate an information technology management process. In the example shown, flow 200 is comprised of a trigger and 13 action steps in response to the trigger. As illustrated, a step can be an action (single step), a sub-flow (a group of steps), or flow logic (e.g., an "if" statement). As another illustrative example, a flow could automate the following process: "When an email is received, create an incident record." Here, the email reception is the trigger and creating the incident record is the step that is to be executed when the trigger condition is met. Flow 200 is also an example of a computerized flow created using a graphical user interface environment. To create a flow in such an environment, users may rely on a set of buttons to add or modify steps. For example, in the example illustrated, button 202 can be used to add an action, sub-flow, or flow logic.

As described previously herein, using a graphical user interface to generate flows has limitations. For example, users must be familiar with the platform tables and fields that the application or process uses and are required to know all the available steps. These requirements make learning to use the graphical user interface more difficult, especially for new users and especially if the design environment has many available steps and configurations. Another limitation is that experienced users may not be aware of new functionalities and can continue to use older features and methods to build flows. In some cases, failing to use the latest features might affect the performance, stability, or security of generated flows. Training of users is a way to overcome this limitation, but it requires considerable human effort. Another limitation is that inexperienced users might not follow best practices when building flows. Some steps require additional handling, e.g., checking for errors or edge cases that affect the quality and stability of the execution of a flow. The techniques disclosed herein for automated flow generation based on a text input address the abovementioned limitations.

FIG. 3 is a diagram illustrating an example of an automatically implemented computerized flow that promotes best practices. From a high-level perspective, creating computerized flows is similar to writing computer code, a difference being that the user can interact with a user interface to create computerized flows instead of writing computer code in a text editor. Similar to writing computer code, users should follow best practices while building flows to ensure quality and robustness. Examples of best practices include handling errors or edge cases and following how a group of users handles some specific use cases. For example, the steps to report an execution error can be for one group to send an email to the administrator or send an SMS for another. However, inexperienced users might not follow these practices. Using the techniques disclosed herein, a machine learning model can predict best practices based on patterns in data and does not require any feature engineering or manual intervention. Furthermore, because this feature is data-centric, it can be adapted to a single user or a group of users without any change in the training procedure and usage. For example, suppose the following verbose flow description: "When an incident record is created, if the caller contains chief then update the incident record else if the caller's country is Brazil then update the incident record else if the caller is a VP then update the incident record. After that, classify the incident case. If the confidence is greater than 80% then update the incident record." Flow 300 is a flow predicted using the techniques disclosed herein for the above flow description. Flow 300 does not include a set of if-else statements (in italics above). Instead, a decision table step was predicted and included in flow 300, which is a better way to handle such a use case compared to a set of if-else statements that are more difficult to maintain. This is an example of promoting best practices that improve flows from a technical perspective and also teaching inexperienced users on how to properly build computerized flows. This reduces the amount of time needed to train inexperienced users, especially when non-technical contributors are a large portion of target users.

Figure 4:
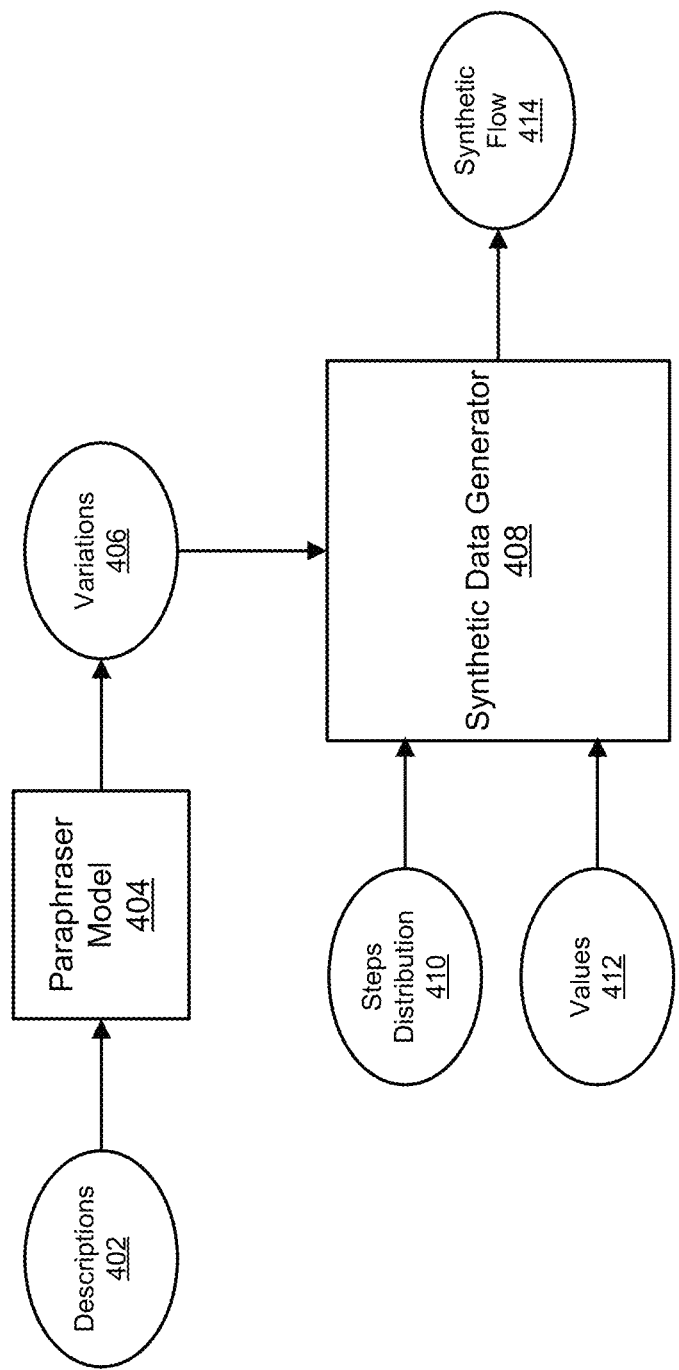
FIG. 4 is a block diagram illustrating an embodiment of a system for synthetically generating training data.

FIG. 4 is a block diagram illustrating an embodiment of a system for synthetically generating training data. In some embodiments, synthetically generated training data is used to train text-to-text model 110 of FIG. 1. Text-to-text model 110 of FIG. 1 can be trained with little or no labeled training data as a result of using synthetically generated training data. It is also possible to perform traditional machine learning model training using labeled training data without using synthetically generated training data. Having a large amount of training data is important because text-to-text model 110 is a deep learning model. However, finding an acceptable amount of labeled data is a challenging task. There may be little prior work from which data can be leveraged, and labeling data is expensive because it requires manual effort. To solve these problems, in some embodiments, text-to-text model 110 is trained in two stages: a first stage in which the model is trained on a large set of synthetically generated data (a goal of this stage is learning how to predict a flow from a natural language description regardless of the actual steps, order, flow length, etc.) and a second stage in which the model is trained on a smaller set of data that reflects the patterns of real users. These training techniques improve model performance and reduce the labeled data requirements. In some scenarios, these training techniques are necessary because, without substantial amounts of data, machine learning-based techniques can perform worse than rule-based systems. Stated alternatively, because of scarcity of training data, data augmentation techniques may be required.

In the example illustrated, paraphraser model 404 receives descriptions 402. In various embodiments, descriptions 402 are known text inputs. These may be known steps of flows that have been previously generated by flow builder application 114 of FIG. 1. In various embodiments, paraphraser model 404 is a text-to-text machine learning model that is trained to generate paraphrased text of descriptions 402. In some embodiments, paraphraser model 404 is an LLM (e.g., the T5 model) that has been specifically trained for a paraphrasing task. Parameters of paraphraser model 404 (e.g., seed, output length, fluency, etc.) can be controlled and varied to generate a set of variations 406 for each input of descriptions 402. After enough plausible descriptions are generated, automation flows can be generated by synthetic data generator 408. In some embodiments, synthetic data generator 408 is comprised of one or more processors configured to construct flows based on input parameters and steps of flows. In the example illustrated, synthetic data generator 408 receives variations 406, steps distribution 410, and values 412 to generate synthetic flow 414. In various embodiments, synthetic data generator 408 first randomly determines a flow length following a known length distribution that matches an existing usage characteristic. The flow length indicates the number of steps that synthetic data generator 408 will take from variations 406 to construct a synthetic flow. Then, in various embodiments, for each step, synthetic data generator 408 randomly selects the step following steps distribution 410, selects one of the step's plausible descriptions at random with equal probability, and generates slot values either randomly for dates, times, emails, etc., or randomly with equal probability from values 412. In various embodiments, steps distribution 410 is a known distribution indicating how likely a specific step occurs in a real case situation. Steps distribution 410 can be drawn from real data to match patterns of a specific user with existing flows or randomly generated. In various embodiments, values 412 is a known set of values for table names, system names, etc. Synthetic data generator 408 can be called multiple times to generate multiple synthetic flows.

Figure 5A:
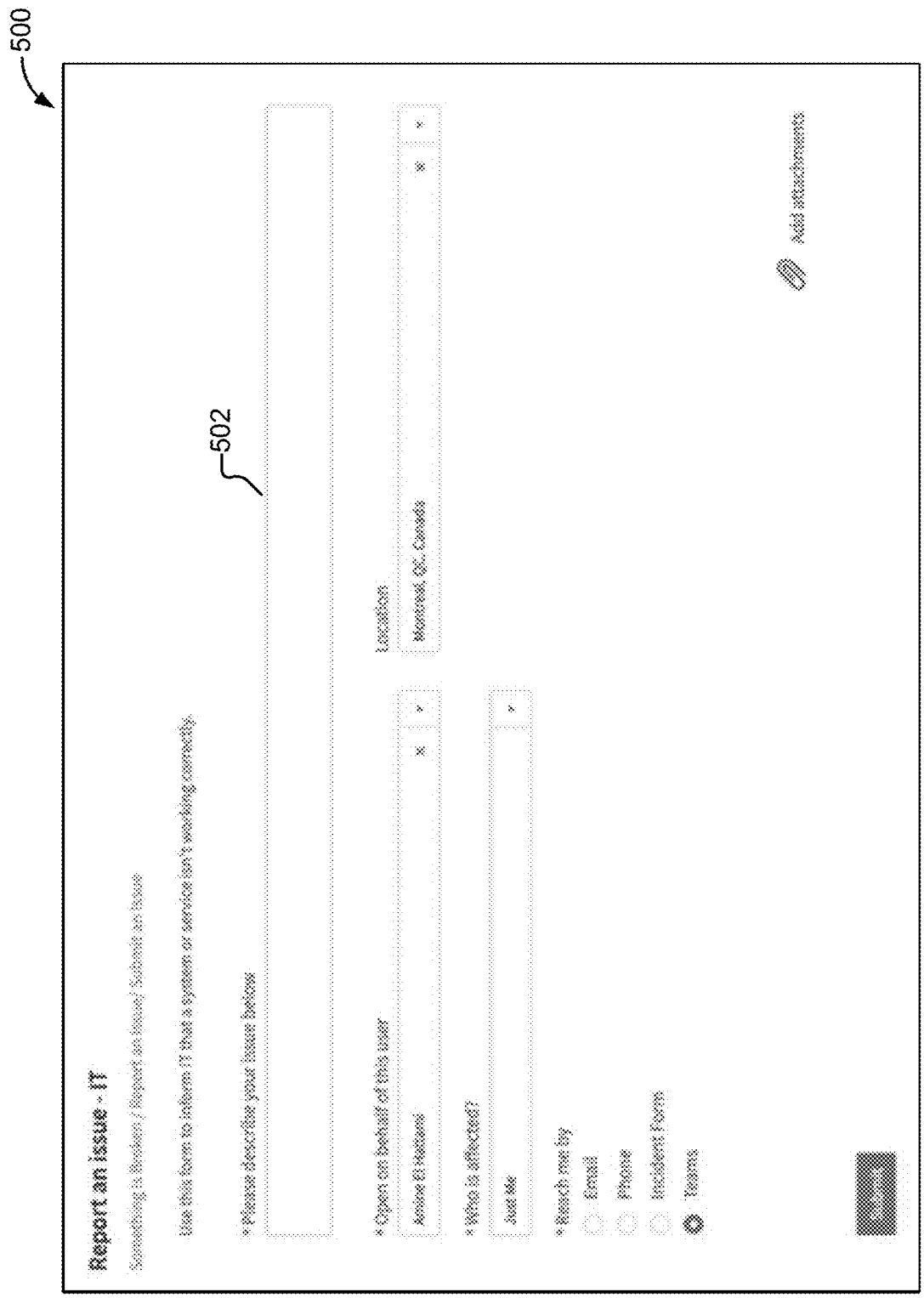
FIGS. 5A-C are diagrams illustrating user interface examples associated with automatically implementing a computerized flow based on text input.
Figure 5B:
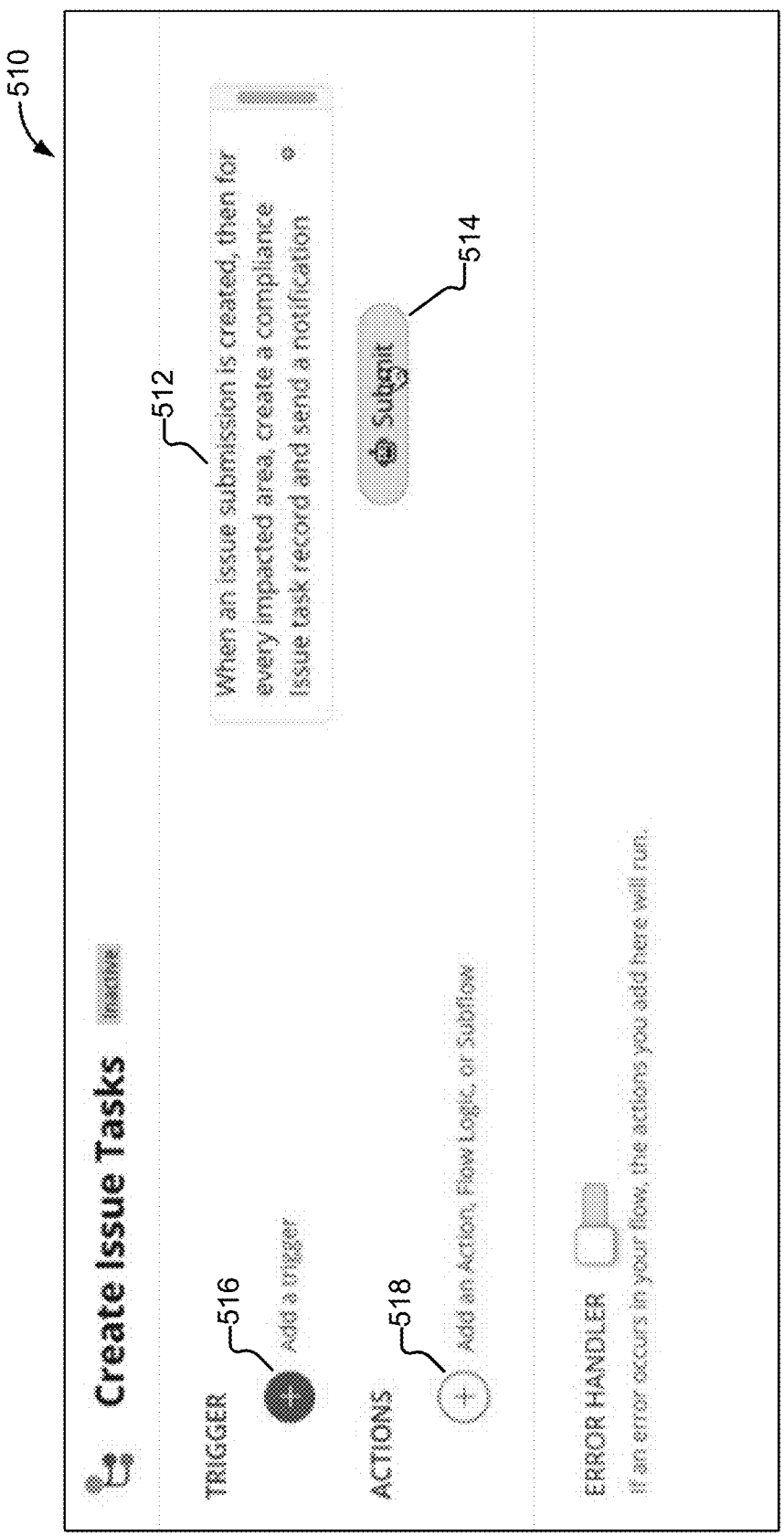
Figure 5C:
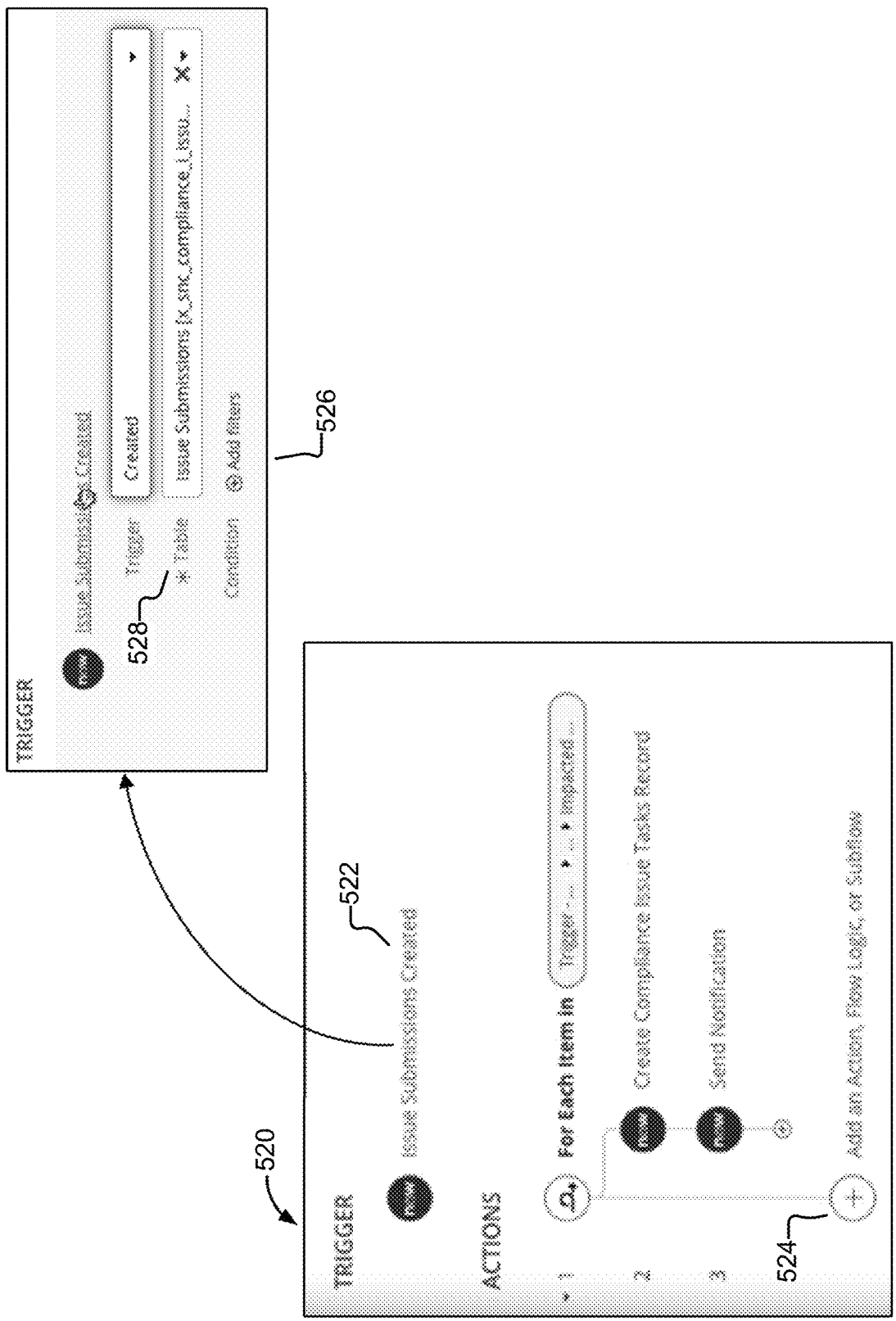

FIGS. 5A-C are diagrams illustrating user interface examples associated with automatically implementing a computerized flow based on text input. In user interface window 500 of FIG. 5A, a user is able to input various information related to (in this specific example) an information technology (IT) issue, including a text description of the IT issue in text box 502. Window 510 of FIG. 5B is an example of an interface element used by a developer after the user has submitted information in user interface window 500. The text in text box 512 is utilized for flow generation. In the example shown, this text reads: "When an issue submission is created, then for every impacted area, create a compliance Issue task record and send a notification". In the example shown, the user is able to click on submit button 514 to submit the flow description in text box 512 for automatic generation of a flow based on the submitted flow description. In some embodiments, the flow description is flow description 120 of FIG. 1 to be submitted to text-to-flow unit 100. In some embodiments, text-to-text model 110 of FIG. 1 is utilized to convert the flow description to API calls to generate a corresponding flow. In the example shown, submission of the flow description occurs within the same user interface used to generate flows graphically. Stated alternatively, in this example, instead of submitting a text description in text box 512, the same flow can be generated by adding a trigger and actions via the graphical user interface using add trigger button 516 and add action button 518.

Flow 520 of FIG. 5C is the flow that has been generated based on the flow description submitted via text box 512. In the example shown, the format of flow 520 is the same as the formats for flow 200 of FIG. 2 and flow 300 of FIG. 3. In the example shown, the "When an issue submission is created" portion of the flow description maps to trigger portion 522 of flow 520, and the other portions of the flow description map to corresponding action steps. In the example illustrated, the user is able to add additional action steps to the generated flow graphically and manually by clicking on add action button 524. In the example shown, the user is also able to examine details of the trigger by clicking on trigger portion 522. This brings up user interface element 526, which includes information about the trigger, including the slot value generated for the trigger. In this case, the slot value is table 528.

Figure 6:
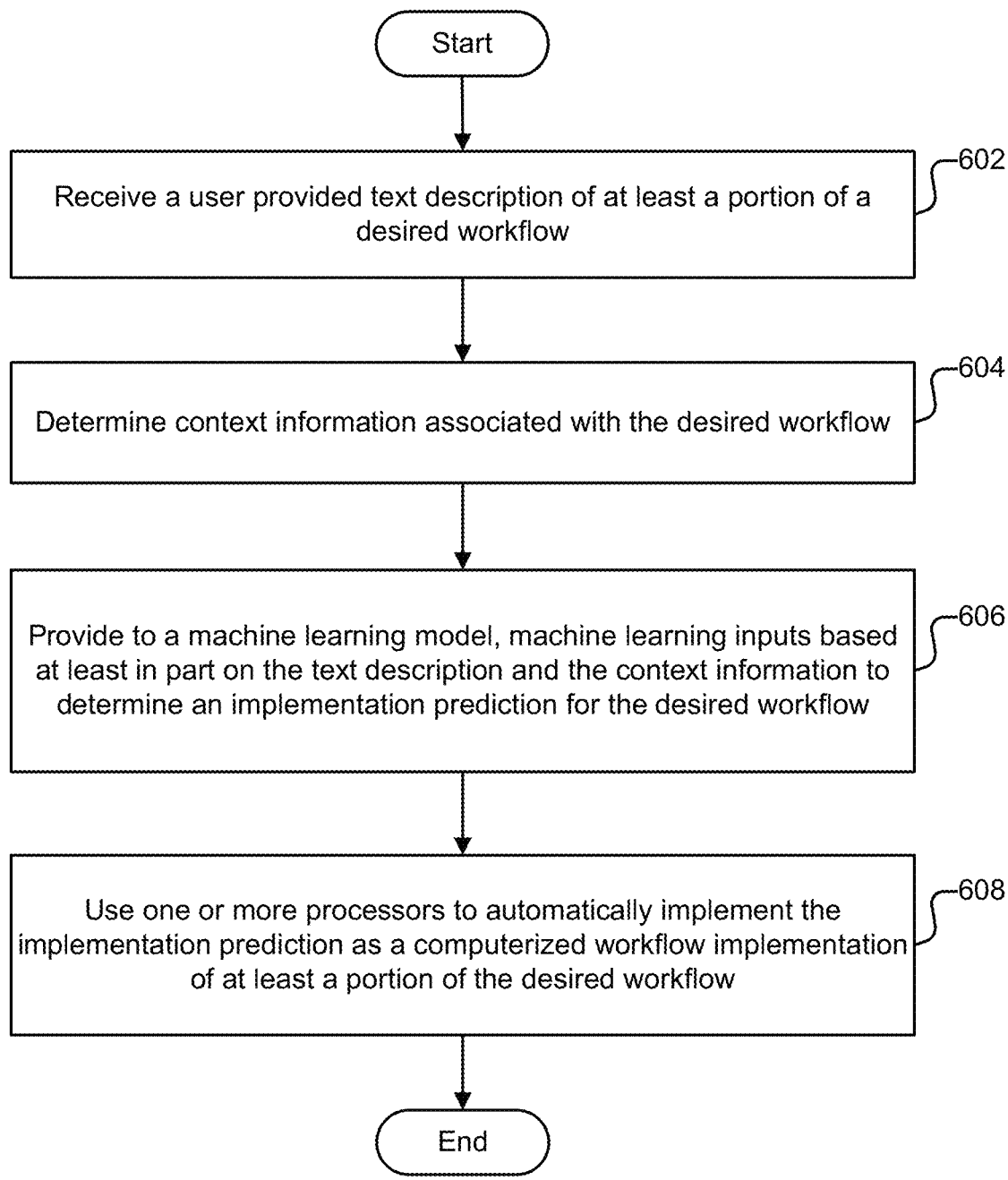
FIG. 6 is a flow diagram illustrating an embodiment of a process for automatically implementing a computerized flow based on text input.

FIG. 6 is a flow diagram illustrating an embodiment of a process for automatically implementing a computerized flow based on text input. In some embodiments, the process of FIG. 6 is performed by text-to-flow unit 100 of FIG. 1.

At 602, a user provided text description of at least a portion of a desired workflow is received. In some embodiments, the user provided text description is flow description 120 of FIG. 1. In various embodiments, the user provided text description is a natural language input from the user.

At 604, context information associated with the desired workflow is determined. In some embodiments, the context information is determined from received inputs other than the received user provided text description. Examples of such inputs include builder current state 122, context 124, and flow embeddings 126 of FIG. 1. Context information may be in the form of various types of information that can be used to condition and refine the ultimate computerized flow that is generated, including but not limited to existing steps of a flow (in a scenario in which the flow generated is a partial flow to be added to the existing steps), metadata and flow generation preferences associated with the flow, and a flow embedding selection that weights and/or biases the underlying machine learning model that is utilized to predict the computerized flow.

At 606, machine learning inputs based at least in part on the text description and the context information are provided to a machine learning model to determine an implementation prediction for the desired workflow. In some embodiments, the machine learning model is text-to-text model 110 of FIG. 1. In various embodiments, the machine learning model outputs the implementation prediction in text form.

At 608, one or more processors are used to automatically implement the implementation prediction as a computerized workflow implementation of at least a portion of the desired workflow. In some embodiments, the implementation prediction is converted from a text format to API calls to a flow builder application. In some embodiments, the flow builder application is flow builder application 114 of FIG. 1.

FIG. 7 is a functional diagram illustrating a programmed computer system. In some embodiments, the process FIG. 6 is executed by computer system 700. Computer system 700 is an example of a processor.

In the example shown, computer system 700 includes various subsystems as described below. Computer system 700 includes at least one microprocessor subsystem (also referred to as a processor or a central processing unit (CPU)) 702. Computer system 700 can be physical or virtual (e.g., a virtual machine). For example, processor 702 can be implemented by a single-chip processor or by multiple processors. In some embodiments, processor 702 is a general-purpose digital processor that controls the operation of computer system 700. Using instructions retrieved from memory 710, processor 702 controls the reception and manipulation of input data, and the output and display of data on output devices (e.g., display 718).

Processor 702 is coupled bi-directionally with memory 710, which can include a first primary storage, typically a random-access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 702. Also, as is well known in the art, primary storage typically includes basic operating instructions, program code, data, and objects used by the processor 702 to perform its functions (e.g., programmed instructions). For example, memory 710 can include any suitable computer-readable storage media, described below, depending on whether, for example, data access needs to be bi-directional or uni-directional. For example, processor 702 can also directly and very rapidly retrieve and store frequently needed data in a cache memory (not shown).

Persistent memory 712 (e.g., a removable mass storage device) provides additional data storage capacity for computer system 700, and is coupled either bi-directionally (read/write) or uni-directionally (read only) to processor 702. For example, persistent memory 712 can also include computer-readable media such as magnetic tape, flash memory, PC-CARDS, portable mass storage devices, holographic storage devices, and other storage devices. A fixed mass storage 720 can also, for example, provide additional data storage capacity. The most common example of fixed mass storage 720 is a hard disk drive. Persistent memory 712 and fixed mass storage 720 generally store additional programming instructions, data, and the like that typically are not in active use by the processor 702. It will be appreciated that the information retained within persistent memory 712 and fixed mass storages 720 can be incorporated, if needed, in standard fashion as part of memory 710 (e.g., RAM) as virtual memory.

In addition to providing processor 702 access to storage subsystems, bus 714 can also be used to provide access to other subsystems and devices. As shown, these can include a display monitor 718, a network interface 716, a keyboard 704, and a pointing device 706, as well as an auxiliary input/output device interface, a sound card, speakers, and other subsystems as needed. For example, pointing device 706 can be a mouse, stylus, track ball, or tablet, and is useful for interacting with a graphical user interface.

Network interface 716 allows processor 702 to be coupled to another computer, computer network, or telecommunications network using a network connection as shown. For example, through network interface 716, processor 702 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 702 can be used to connect computer system 700 to an external network and transfer data according to standard protocols. Processes can be executed on processor 702, or can be performed across a network such as the Internet, intranet networks, or local area networks, in conjunction with a remote processor that shares a portion of the processing. Additional mass storage devices (not shown) can also be connected to processor 702 through network interface 716.

An auxiliary I/O device interface (not shown) can be used in conjunction with computer system 700. The auxiliary I/O device interface can include general and customized interfaces that allow processor 702 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 7 is but an example of a computer system suitable for use with the various embodiments disclosed herein. Other computer systems suitable for such use can include additional or fewer subsystems. In addition, bus 714 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving a user provided text description comprising a sequence of action steps associated with a requested workflow;
determining context information associated with the requested workflow based on selecting an embedding of a plurality of embeddings, wherein the plurality of embeddings is generated for a pretrained machine learning model and comprises dynamically swappable options to selectively condition the pretrained machine learning model using different training datasets;
providing, to the pretrained machine learning model, machine learning inputs based at least in part on the text description and the context information to determine a predicted implementation of the requested workflow; and
using one or more processors to generate a computerized workflow based on the predicted implementation of the requested workflow, wherein the computerized workflow comprises the sequence of action steps associated with the requested workflow.

2. The method of claim 1, wherein the user provided text description comprises a natural language input describing a series of the sequence of action steps associated with the requested workflow.

3. The method of claim 1, wherein the computerized workflow comprises a trigger condition and at least one of the sequence of action steps that is configured to execute in response to a determination that the trigger condition has occurred.

4. The method of claim 1, wherein determining the context information includes processing data associated with the sequence of action steps associated with the requested workflow.

5. The method of claim 1, wherein determining the context information includes processing data associated with conditioning parameters for the pretrained machine learning model.

6. The method of claim 1, wherein determining the context information includes converting data in an Extensible Markup Language (XML) or JavaScript Object Notation (JSON) format to a text format.

7. The method of claim 1, wherein determining the context information includes selecting a tensor data object from a list of tensor data objects, wherein each tensor data object of the list of tensor data objects is associated with different embeddings weights for the pretrained machine learning model.

8. The method of claim 1, wherein the pretrained machine learning model is a text-to-text pretrained language model.

9. The method of claim 8, wherein the text-to-text pretrained language model includes an encoder-decoder architecture.

10. The method of claim 1, wherein the pretrained machine learning model has been trained on a large-scale language dataset and fine-tuned for a text-to-workflow prediction task.

11. The method of claim 1, wherein the pretrained machine learning model has been trained based at least in part on synthetically generated training data.

12. The method of claim 11, wherein the synthetically generated training data includes multiple variations of non-synthetically generated workflow descriptions.

13. The method of claim 1, wherein using the one or more processors to generate the computerized workflow includes converting the predicted implementation of the requested workflow from a text format to one or more application programming interface messages.

14. The method of claim 13, further comprising transmitting the one or more application programming interface messages to an application configured to generate the computerized workflow.

15. The method of claim 1, wherein the computerized workflow comprises a portion of the requested workflow.

16. The method of claim 1, further comprising displaying the computerized workflow in a graphical user interface.

17. The method of claim 16, further comprising receiving a user request via the graphical user interface to add a step to the computerized workflow.

18. The method of claim 1, wherein the user provided text description is associated with an information technology issue.

19. A system, comprising:
one or more processors configured to:
receive a user provided text description comprising a sequence of action steps associated with a requested workflow;
determine context information associated with the requested workflow based on selecting an embedding of a plurality of embeddings, wherein the plurality of embeddings is generated for a pretrained machine learning model and comprises dynamically swappable options to selectively condition the pretrained machine learning model using different training datasets;
provide to the pretrained machine learning model, machine learning inputs based at least in part on the text description and the context information to determine a predicted implementation of the requested workflow; and
generate a computerized workflow based on the predicted implementation of the requested workflow, wherein the computerized workflow comprises the sequence of action steps associated with the requested workflow; and
a memory coupled to at least one of the one or more processors and configured to provide at least one of the one or more processors with instructions.

20. A computer program product embodied in a non-transitory computer readable medium and comprising computer instructions for:
receiving a user provided text description comprising a sequence of action steps associated with a requested workflow;
determining context information associated with the requested workflow based on selecting an embedding of a plurality of embeddings, wherein the plurality of embeddings is generated for a pretrained machine learning model and comprises dynamically swappable options to selectively condition the pretrained machine learning model using different training datasets;
providing to the pretrained machine learning model, machine learning inputs based at least in part on the text description and the context information to determine a predicted implementation of the requested workflow; and
generating a computerized workflow based on the predicted implementation of the requested workflow, wherein the computerized workflow comprises the sequence of action steps associated with the requested workflow.

* * * * *